United States Patent [19]

Suzuki

[11] Patent Number: 5,502,596
[45] Date of Patent: Mar. 26, 1996

[54] IMMERSION MICROSCOPE OBJECTIVE

[75] Inventor: Toshinobu Suzuki, Tokyo, Japan

[73] Assignee: Olympus Optical Co., Ltd., Tokyo, Japan

[21] Appl. No.: 154,556

[22] Filed: Nov. 19, 1993

[30] Foreign Application Priority Data

Nov. 20, 1992 [JP] Japan ..................... 4-311702

[51] Int. Cl.$^6$ ................................. G02B 21/02
[52] U.S. Cl. ................. 359/657; 359/656; 359/658; 359/659
[58] Field of Search ................. 359/656, 657, 359/658, 659

[56] References Cited

U.S. PATENT DOCUMENTS

| | | | |
|---|---|---|---|
| 2,644,943 | 7/1953 | Klein | 359/658 |
| 3,530,436 | 9/1970 | Beutele et al. | 359/657 |
| 3,746,428 | 7/1973 | Shoemaker | 359/657 |
| 3,902,793 | 9/1975 | Shoemaker | 359/659 |
| 4,232,940 | 11/1980 | Nakagawa | 359/658 |
| 4,373,785 | 2/1983 | Shoemaker | 359/656 |
| 4,376,570 | 3/1983 | Sussman | 359/659 |
| 4,537,472 | 8/1985 | Asoma | 359/658 |

FOREIGN PATENT DOCUMENTS

| | | | |
|---|---|---|---|
| 2828173 | 1/1979 | Germany | 359/658 |
| 44-16476 | 7/1969 | Japan . | |
| 58-192013 | 11/1983 | Japan . | |
| 61-240218 | 10/1986 | Japan | 359/656 |

*Primary Examiner*—Georgia Y. Epps
*Assistant Examiner*—Michael A. Papalas
*Attorney, Agent, or Firm*—Cushman, Darby & Cushman

[57] ABSTRACT

An apochromat-class immersion microscope objective having a magnification of about 40, a NA of about 1.0, and a satisfactorily flattened image field. The microscope objective includes a first lens unit G1 of positive refractive power which has a cemented lens composed of a plano-convex lens and a meniscus lens having a strong concave surface directed toward the object side, a second lens unit G2 having a cemented lens composed of three lens elements, that is, negative, positive and negative lenses, a third lens unit G3 having a cemented lens, a fourth lens unit G4 including a cemented meniscus lens having a strong concave surface directed toward the image side, and a fifth lens unit G5 including a cemented meniscus lens composed of a negative lens and a positive lens and having a strong concave surface directed toward the object side. The microscope objective satisfies conditions concerning the refractive index difference between the first and fifth lens units, the focal lengths of the first and fourth lens units, and the back focus of the entire system.

3 Claims, 7 Drawing Sheets

Spherical aberration

Astigmatism

Distortion

Coma

Spherical aberration

Astigmatism

Distortion

Coma

Spherical aberration

Astigmatism

Distortion

Coma

FIG. 9A
Spherical aberration
FIG. 9B
Astigmatism
FIG. 9C
Distortion
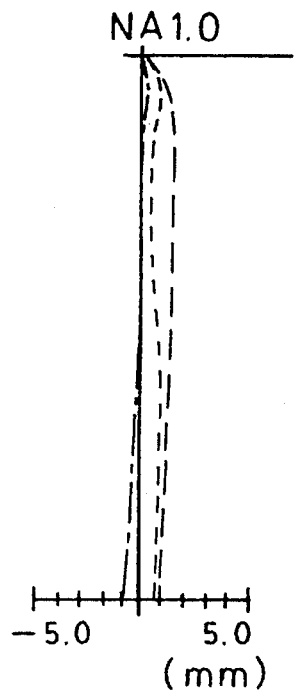
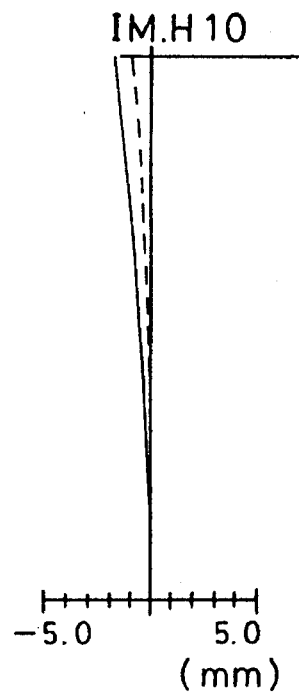
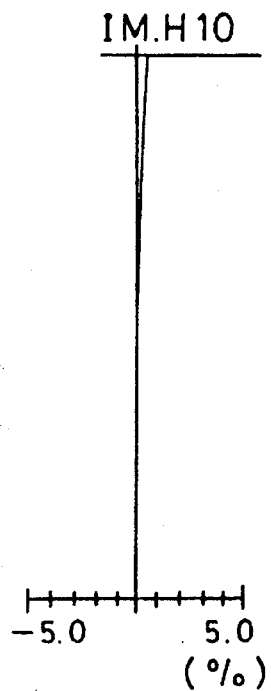
FIG. 9D
FIG. 9E
Coma
FIG. 9F
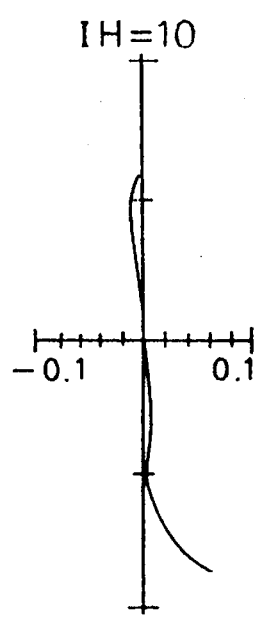
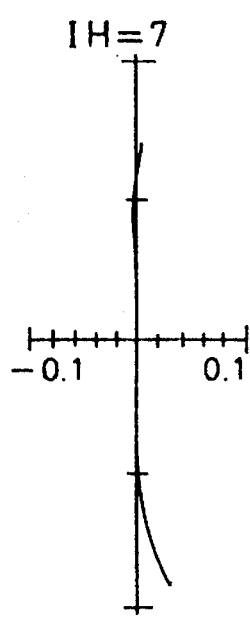
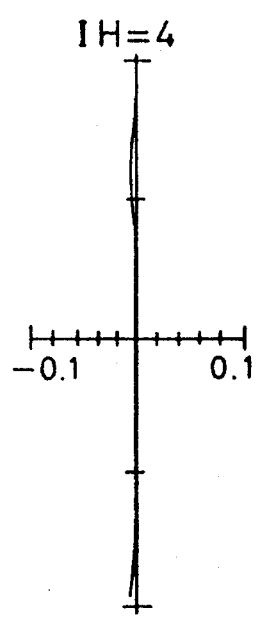

IMMERSION MICROSCOPE OBJECTIVE

BACKGROUND OF THE INVENTION

1. Field of the Invention

The present invention relates to immersion microscope objectives. More particularly, the present invention relates to an apochromat-class microscope objective having a magnification of about 40, a numerical aperture of about 1.0, and a flat image field.

2. Related Art

Japanese Patent Application Post-Exam Publication No. 44-16476 (1969), filed by the present assignee, discloses an objective of the same specifications as those of the present invention, which will be described later. The prior application aims at providing an objective in the apochromat class.

U.S. Pat. No. 2,644,943 discloses an objective having an arrangement which is the closest to that of the objective of the present invention among the conventional objectives. The objective has a magnification of 100 and a numerical aperture (hereinafter referred to as "NA") of 1.4, and it includes a plano-convex lens, two meniscus single lenses, a cemented lens having three lens elements, i.e., negative, positive and negative lenses, a cemented lens having two lens elements, i.e., positive and negative lenses, a cemented meniscus lens having a strong concave surface directed toward the image side, and a meniscus single lens having a strong concave surface directed toward the object side.

Japanese Patent Application Laid-Open (KOKAI) No. 58-192013 (1983), filed by the present assignee, discloses an objective having a magnification of 100 and a NA of 1.25. The objective includes a plano-convex lens, two meniscus single lenses, a cemented lens having three lens elements, i.e., positive, negative and positive lenses, a positive single lens, a cemented meniscus lens having a strong concave surface directed toward the image side, and a meniscus single lens having a strong concave surface directed toward the object side.

The objective disclosed in Japanese Patent Application Post-Exam Publication No. 44-16476 (1969) corrects chromatic aberration at the apochromat level. However, the publication makes no comment on the flatness of the image field, and the disclosed objective is extremely inferior in the flatness of the image field. The reason for this is that the objective adopts neither a buried lens for the front lens nor a Gauss type lens for the lens system.

Since the other conventional techniques and the present invention are entirely different from each other in the specifications, no direct comparison can be made between them. However, we may safely say that the prior art suffers from the following disadvantages. That is, although the objective is designed for infinity, U.S. Pat. No. 2,644,943 provides neither data on an imaging lens nor graphs showing aberrations. Therefore, the present assignee evaluated this patent by ray tracing with an imaging lens having substantially no aberration set therefor. As a result, it was revealed that spherical and comatic aberrations were exceedingly large for an objective having a NA of 1.4. The U.S. patent publication is right in stating that the Petzval sum is extremely small. However, since the coma is exceedingly large, the flatness of the image field must be said to be inferior, no matter how small the Petzval sum is. If the NA of a condenser lens in the illuminating system is reduced in actual use of the objective, the effect of coma may become inconspicuous. However, such a manner of using the objective makes the design NA of 1.4 meaningless. In view of the state of the art around the year 1950, it is considered that there was no anomalous dispersion glass material for a negative lens. Accordingly, it is expected that the objective of U.S. Pat. No. 2,644,943 suffers from large chromatic aberration (secondary spectrum), and the quality of the image observed is considerably degraded.

Japanese Patent Application Laid-Open (KOKAI) No. 58-192013 (1983) also largely differs in the specifications from the objective of the present invention, and it aims at effectively correcting various aberrations with a lens arrangement having a relatively small number of lens elements and without using a special material in a large quantity. Therefore, the present applicant will not make a comment on the conventional objective in particular.

SUMMARY OF THE INVENTION

In view of the above-described circumstances, it is an object of the present invention to provide an apochromat-class immersion microscope objective having a magnification of about 40, a NA of about 1.0, and a satisfactorily flattened image field.

To attain the above-described object, the present invention provides a microscope objective which includes, in order from the object side, a first lens unit of positive refractive power which has a cemented lens composed of a plano-convex lens and a meniscus lens having a concave surface directed toward the object side, a second lens unit having a cemented lens composed of three lens elements, that is, negative, positive and negative lenses, a third lens unit having a cemented lens, a fourth lens unit including a cemented meniscus lens having a concave surface directed toward the image side, and a fifth lens unit including a cemented meniscus lens composed of a negative lens and a positive lens and having a concave surface directed toward the object side. The microscope objective satisfies the following conditions:

$$n_2 - n_1 > 0.1 \quad (1)$$

$$n_{13} - n_{12} > 0.15 \quad (2)$$

$$f/f_1 > 0.65 \quad (3)$$

$$|f/f_4| < 0.2 \quad (4)$$

$$-0.8 < F_B/D < -0.3 \quad (5)$$

where $n_1$ and $n_2$ are the respective refractive indices of the plano-convex lens and the meniscus lens having a concave surface directed toward the object side in the first lens unit; $n_{12}$ and $n_{13}$ are the respective refractive indices of the negative and positive lenses in the fifth lens unit; $f_1$, $f_4$ and $f$ are the respective focal lengths of the first lens unit, the fourth lens unit and the entire system; $F_B$ is the back focus of the entire system (the distance from the last surface of the entire system to the rear focal point thereof); and D is the distance from the first lens surface to the final lens surface in the entire system.

In this case, the first lens unit preferably includes a cemented lens composed of a plano-convex lens and a meniscus lens having a concave surface directed toward the object side, a meniscus lens having a concave surface directed toward the object side, and a positive lens.

In addition, the present invention provides an immersion microscope objective which includes, in order from the object side, a plano-convex cemented lens composed of a plano-convex lens and a meniscus lens having a concave surface directed toward the object side, a plurality of single lenses, a plurality of cemented lenses, and two lenses concave surfaces of which face each other.

In this case, it is preferable to satisfy the following conditions:

$$n_2 - n_1 > 0.1 \tag{1}$$

$$f/f_1 > 0.65 \tag{3}$$

$$-0.8 < F_B/D < -0.3 \tag{5}$$

where $n_1$ and $n_2$ are the respective refractive indices of the plano-convex lens and the meniscus lens having a concave surface directed toward the object side; $f_1$ is the focal length of the plano-convex cemented lens; $f$ is the focal length of the entire system; $F_B$ is the back focus of the entire system; and D is the distance from the first lens surface to the final lens surface in the entire system.

Furthermore, the two lenses whose concave surfaces face each other preferably include a lens having a concave surface directed toward the image side, and a cemented lens composed of a positive lens and a negative lens and having a concave surface directed toward the object side, and it is preferable to satisfy the following conditions:

$$n_{13} - n_{12} > 0.15 \tag{2}$$

$$|f/f_4| < 0.2 \tag{4}$$

where $n_{12}$ and $n_{13}$ are the respective refractive indices of the negative and positive lenses of the cemented lens; and $f_4$ is the focal length of the lens having a concave surface directed toward the image side.

The reason for adopting the above-described arrangements and the functions thereof will be explained below.

First, in order to obtain a plan objective, a cemented lens is used as the front lens in the first lens unit, and the radius of curvature of the cemented surface of the cemented lens is made extremely small so that the cemented surface has a negative power, although this is a well-known technique. Further, a lens unit of the Gauss type is disposed in the rear part of the objective, that is, the fourth and fifth lens units in this case, so that the curvature of field is corrected by the action of the concave surfaces of the Gauss type lens unit, although this is also a well-known technique. Next, in order to effectively correct spherical and axial chromatic aberrations, a three-element cemented lens composed of negative, positive and negative lenses is disposed in the second lens unit, and a cemented lens is disposed in the third lens unit. If an anomalous dispersion glass material is used for the second and third lens units, the secondary spectrum of axial chromatic aberration can be corrected even more effectively.

The above-described condition (1) defines the range of differences in refractive index between the two lenses as the front lens in the first lens unit. The condition (1) must be satisfied in order to minimize the Petzval sum. If the refractive index difference is outside the range defined by the condition (1), i.e., not larger than 0.1, the curvature radius of the cemented surface of the front lens becomes too small to obtain the required refractive power. As a result, spherical and comatic aberrations are aggravated.

The condition (2) defines the refractive index difference between the negative and positive lenses in the fifth lens unit. The condition (2) must be satisfied for effective correction of coma. The negative lens in the fifth lens unit preferably has a relatively small refractive index with a view to minimizing the Petzval sum and correcting coma which is likely to occur in the negative direction with respect to the image field. The positive lens in the fifth lens unit preferably has a relatively large refractive index. The reason for this is as follows: If the refractive index of the positive lens is small, the curvature radius of the final lens surface of the fifth lens unit decreases, so that coma becomes likely to occur in the negative direction with respect to the image field. If the refractive index difference is outside the range defined by the condition (2), i.e., not larger than 0.15, it becomes difficult to correct coma effectively.

The condition (3) defines the power of the first lens unit. The condition (3) must be satisfied in order to effectively correct spherical and other aberrations in the second and following lens units. If $f/f_1$ is outside the range defined by the condition (3), i.e., not larger than 0.65, the focal length of the first lens unit becomes excessively long, resulting in a reduction in the power thereof. Consequently, the bundle of rays entering the second lens unit become considerably divergent. Since the cemented surface of the second lens unit has a negative power, it is difficult with the divergent bundle of rays to make use of the negative power of the cemented surface.

The condition (4) defines the power of the fourth lens unit. It is preferable that the power of the fourth lens unit should not be very strong with a view to effectively correcting coma. To minimize the Petzval sum, it is preferable to increase the negative power, as a matter of course. In the present invention, however, the cemented surface of the front lens in the first lens unit is assigned the function to minimize the Petzval sum. Therefore, the power of the fourth lens unit should not be made stronger than is needed. If $|f/f_4|$ is outside the range defined by the condition (4), i.e., not smaller than 0.2, many comatic aberrations occur in the positive direction with respect to the image field.

The condition (5) defines the range of the back focus of the objective. The condition (5) must be satisfied in order to effectively correct spherical, astigmatic and comatic aberrations. If $F_B/D$ is not larger than the lower limit of the condition (5), i.e., −0.8, the back focus lies undesirably deep in the lens system, so that it is difficult to correct astigmatic and comatic aberrations. To effectively correct astigmatic and comatic aberrations, it is generally preferable that off-axis chief rays should pass through the air spacing between the 4-th and 5-th lens units. By doing so, the astigmatic difference can be reduced, and coma can be corrected with good symmetry. However, in the case of an objective of high magnification, the power of the front lent unit is high; therefore, the above-described scheme is difficult to carry out in practice. If the lower limit of the condition (5) is not reached, many comatic aberrations occur unsymmetrically, and the astigmatic difference increases to a considerable extent. If the upper limit of the condition (5) is exceeded, i.e., $F_B/D$ is not smaller than −0.3, the ray height in the second and third lens units becomes excessively high, so that it is difficult to correct spherical and other aberrations.

Finally, it is necessary here to add supplementary comments on U.S. Pat. No. 2,644,943. That is, the microscope objective disclosed therein fails to satisfy any of the above-described conditions.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 9A–9F graphically show spherical aberration, astigmatism, distortion and coma in Example 4.

DESCRIPTION OF THE PREFERRED EMBODIMENTS

Figure 1:
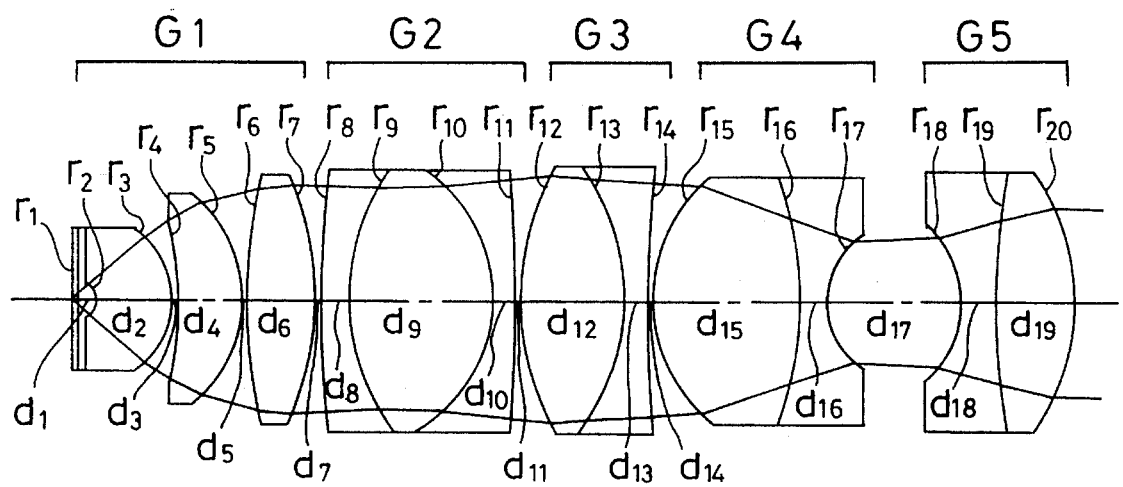
FIG. 1 is a sectional view of Example 1 of the immersion microscope objective according to the present invention.
Figure 2:
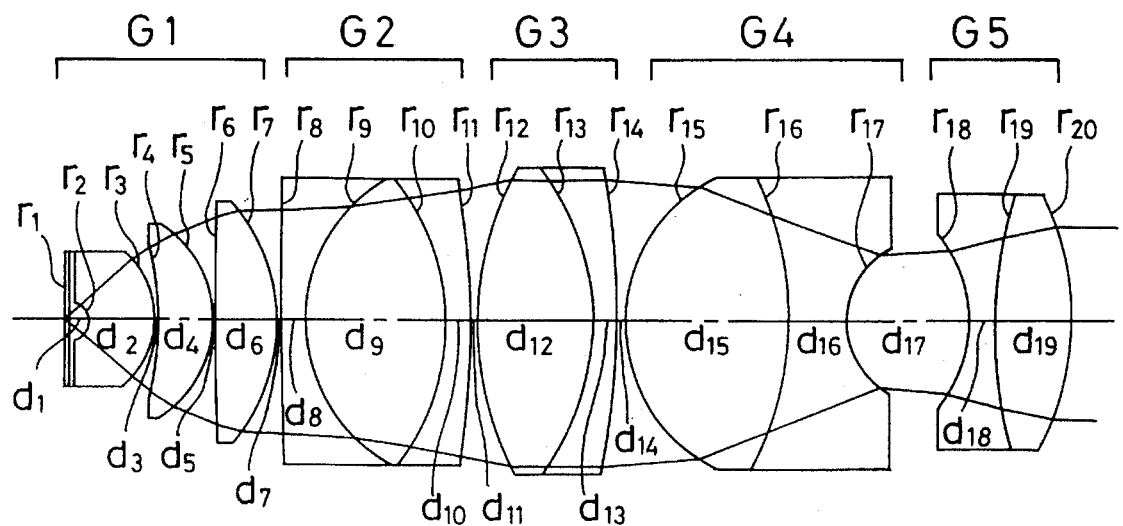
FIG. 2 is a sectional view of Example 2 of the immersion microscope objective according to the present invention.
Figure 3:
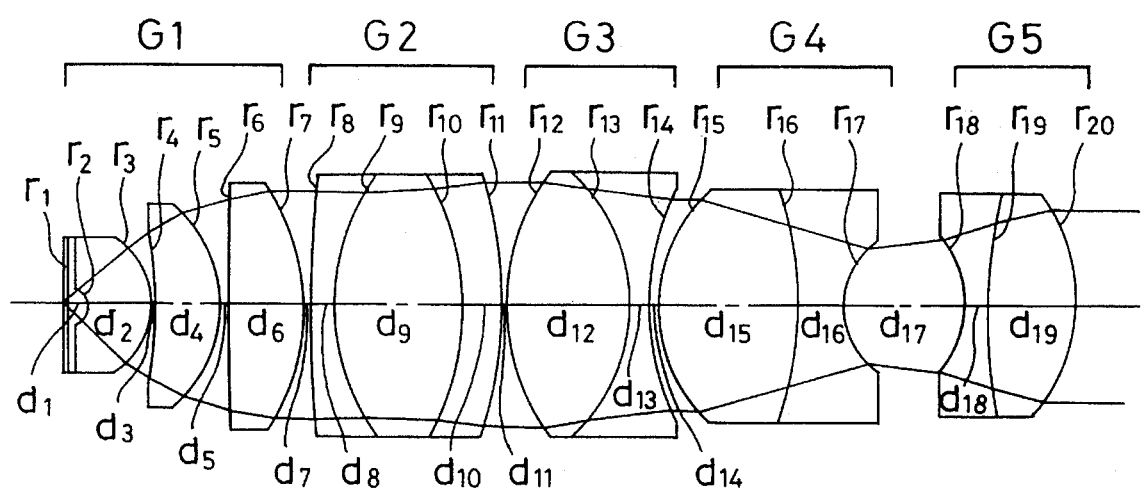
FIG. 3 is a sectional view of Example 3 of the immersion microscope objective according to the present invention.
Figure 4:
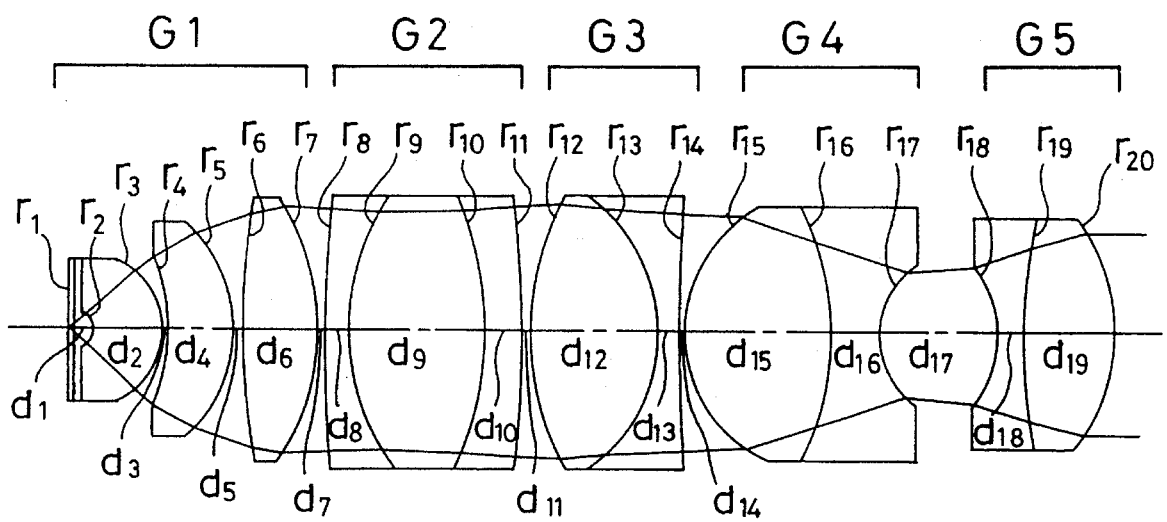
FIG. 4 is a sectional view of Example 4 of the immersion microscope objective according to the present invention.

Examples 1 to 4 of the immersion microscope objective according to the present invention will be described below. Lens data in Examples 1 to 4 will be described later. The lens arrangements of Examples 1 to 4 are shown in the sectional views of FIGS. 1 to 4, respectively.

Regarding the arrangement of each lens unit, the first lens unit G1 in Examples 1 and 4 has four lens elements, that is, a cemented lens composed of a plano-convex lens and a negative meniscus lens having a concave surface directed toward the object side, a positive meniscus lens having a concave surface directed toward the object side, and a double-convex lens. In Examples 2 and 3, the first lens unit G1 has four lens elements, that is, a cemented lens composed of a plano-convex lens and a negative meniscus lens having a concave surface directed toward the object side, and two positive meniscus lenses each having a concave surface directed toward the object side. The second lens unit G2 in Examples 1, 3 and 4 has a cemented lens composed of three lens elements, that is, a negative meniscus lens having a concave surface directed toward the image side, a double-convex lens, and a negative meniscus lens having a concave surface directed toward the object side. In Example 2, the second lens unit G2 has a cemented lens composed of three lens elements, that is, a double-concave lens, a double-convex lens, and a negative meniscus lens having a concave surface directed toward the object side. The third lens unit G3 in Examples 1, 3 and 4 has a cemented lens composed of a double-convex lens and a double-concave lens. In Example 2, the third lens unit G3 has a cemented lens composed of a double-convex lens and a negative meniscus lens having a concave surface directed toward the object side. In all Examples 1 to 4, the fourth lens unit G4 has a cemented meniscus lens composed of a double-convex lens and a double-concave lens, and the fifth lens unit G5 has a cemented meniscus lens composed of a double-concave lens and a double-convex lens.

Lens data in Examples 1 to 4 is set forth below. In the following: $r_1, r_2 \ldots$ are the curvature radii of lens surfaces, which are shown in order from the object side; $d_1, d_2 \ldots$ are the spacings between adjacent lens surfaces, shown in order from the object side; $n_{d1}, n_{d2} \ldots$ are the refractive indices of the lenses for the spectral d-line, shown in order from the object side; and $v_{d1}, v_{d2} \ldots$ are the Abbe numbers of the lenses, shown in order from the object side.

In each Example, the focal length f is 4.5, the magnification is 40, and the numerical aperture NA is 1.0. The working distance is 0.16 in Examples 1 and 2, and it is 0.1553 in Examples 3 and 4. It should be noted that each Example employs an oil immersion system designed so that the refractive index and Abbe number of an oil used are $n_d=1.51548$ and $v_d=43.10$, respectively.

Example 1

| | | | |
|---|---|---|---|
| $r_1 = \infty$ | $d_1 = 0.7000$ | | |
| $r_2 = -0.9523$ | $d_2 = 3.7000$ | $n_{d1} = 1.51633$ | $v_{d1} = 64.15$ |
| $r_3 = -3.9182$ | $d_3 = 0.2000$ | $n_{d2} = 1.78650$ | $v_{d2} = 50.00$ |
| $r_4 = 13.6059$ | $d_4 = 3.2000$ | $n_{d3} = 1.56907$ | $v_{d3} = 71.30$ |
| $r_5 = -6.0008$ | $d_5 = 0.1000$ | | |
| $r_6 = 23.6082$ | $d_6 = 3.3000$ | $n_{d4} = 1.43875$ | $v_{d4} = 94.97$ |
| $r_7 = -13.7010$ | $d_7 = 0.2010$ | | |
| $r_8 = 121.0789$ | $d_8 = 1.0000$ | $n_{d5} = 1.61340$ | $v_{d5} = 43.84$ |
| $r_9 = 9.3172$ | $d_9 = 7.0000$ | $n_{d6} = 1.43875$ | $v_{d6} = 94.97$ |
| $r_{10} = -7.0291$ | $d_{10} = 1.0000$ | $n_{d7} = 1.52944$ | $v_{d7} = 51.72$ |
| $r_{11} = -59.3039$ | $d_{11} = 0.2000$ | | |
| $r_{12} = 12.0065$ | $d_{12} = 5.1000$ | $n_{d8} = 1.43875$ | $v_{d8} = 94.97$ |
| $r_{13} = -9.6812$ | $d_{13} = 1.0000$ | $n_{d9} = 1.51633$ | $v_{d9} = 64.15$ |
| $r_{14} = 79.6452$ | $d_{14} = 0.1000$ | | |
| $r_{15} = 7.3673$ | $d_{15} = 6.8854$ | $n_{d10} = 1.49700$ | $v_{d10} = 81.10$ |
| $r_{16} = 15.9789$ | $d_{16} = 1.5066$ | $n_{d11} = 1.52944$ | $v_{d11} = 51.72$ |
| $r_{17} = 3.6919$ | $d_{17} = 6.1606$ | | |
| $r_{18} = -4.9622$ | $d_{18} = 1.3101$ | $n_{d12} = 1.51633$ | $v_{d12} = 64.15$ |
| $r_{19} = 29.2808$ | $d_{19} = 4.0001$ | $n_{d13} = 1.78650$ | $v_{d13} = 50.00$ |
| $r_{20} = -9.6143$ | | | |

$f_1 = 5.103$, $f_4 = -42.523$, $F_B = -27.003$, $D = 46.66$
 (1) $n_2 - n_1 = 0.27017$
 (2) $n_{13} - n_{12} = 0.27017$
 (3) $f/f_1 = 0.882$
 (4) $|f/f_4| = 0.106$
 (5) $F_B/D = -0.579$

Example 2

| | | | |
|---|---|---|---|
| $r_1 = \infty$ | $d_1 = 0.7000$ | $n_{d1} = 1.51633$ | $v_{d1} = 64.15$ |
| $r_2 = -1.0790$ | $d_2 = 3.2000$ | $n_{d2} = 1.78650$ | $v_{d2} = 50.00$ |
| $r_3 = -4.2001$ | $d_3 = 0.2000$ | | |
| $r_4 = -11.5640$ | $d_4 = 2.6000$ | $n_{d3} = 1.56907$ | $v_{d1} = 71.30$ |
| $r_5 = -5.3748$ | $d_5 = 0.2000$ | | |
| $r_6 = -174.4681$ | $d_6 = 2.8000$ | $n_{d4} = 1.49700$ | $v_{d4} = 81.10$ |
| $r_7 = -8.9533$ | $d_7 = 0.2010$ | | |
| $r_8 = -427.9076$ | $d_8 = 1.0000$ | $n_{d5} = 1.61340$ | $v_{d5} = 43.84$ |
| $r_9 = 7.8375$ | $d_9 = 6.8000$ | $n_{d6} = 1.43875$ | $v_{d6} = 94.97$ |
| $r_{10} = -9.5103$ | $d_{10} = 1.0000$ | $n_{d7} = 1.52944$ | $v_{d7} = 51.72$ |
| $r_{11} = -34.3387$ | $d_{11} = 0.2000$ | | |
| $r_{12} = 15.1902$ | $d_{12} = 5.5000$ | $n_{d8} = 1.43875$ | $v_{d8} = 94.97$ |
| $r_{13} = -11.4926$ | $d_{13} = 1.0000$ | $n_{d9} = 1.51633$ | $v_{d9} = 64.15$ |
| $r_{14} = -36.7230$ | $d_{14} = 0.4000$ | | |
| $r_{15} = 7.8936$ | $d_{15} = 7.7481$ | $n_{d10} = 1.43875$ | $v_{d10} = 94.97$ |
| $r_{16} = -14.3580$ | $d_{16} = 2.8200$ | $n_{d11} = 1.50847$ | $v_{d11} = 60.83$ |
| $r_{17} = 3.8298$ | $d_{17} = 5.5936$ | | |
| $r_{18} = -5.6613$ | $d_{18} = 1.0011$ | $n_{d12} = 1.50847$ | $v_{d12} = 60.83$ |
| $r_{19} = 15.8403$ | $d_{19} = 4.0001$ | $n_{d13} = 1.78650$ | $v_{d13} = 50.00$ |
| $r_{20} = -11.5480$ | | | |

$f_1 = 5.567$, $f_4 = -35.851$, $F_B = -22.303$, $D = 46.964$
 (1) $n_2 - n_1 = 0.27017$
 (2) $n_{13} - n_{12} = 0.27803$
 (3) $f/f_1 = 0.808$
 (4) $|f/f_4| = 0.126$
 (5) $F_B/D = -0.475$

Example 3

| | | | |
|---|---|---|---|
| $r_1 = \infty$ | $d_1 = 0.8000$ | $n_{d1} = 1.51633$ | $v_{d1} = 64.15$ |
| $r_2 = -0.9827$ | $d_2 = 3.2000$ | $n_{d2} = 1.78650$ | $v_{d2} = 50.00$ |
| $r_3 = -3.5800$ | $d_3 = 0.1756$ | | |
| $r_4 = -13.6805$ | $d_4 = 3.0000$ | $n_{d3} = 1.56907$ | $v_{d3} = 71.30$ |
| $r_5 = -6.0010$ | $d_5 = 0.3340$ | | |
| $r_6 = -182.1012$ | $d_6 = 3.5000$ | $n_{d4} = 1.49700$ | $v_{d4} = 81.10$ |
| $r_7 = -9.9807$ | $d_7 = 0.2000$ | | |
| $r_8 = 67.0214$ | $d_8 = 1.0000$ | $n_{d5} = 1.61340$ | $v_{d5} = 43.84$ |
| $r_9 = 9.4123$ | $d_9 = 6.3000$ | $n_{d6} = 1.43875$ | $v_{d6} = 94.97$ |
| $r_{10} = -11.3256$ | $d_{10} = 1.7000$ | $n_{d7} = 1.61340$ | $v_{d7} = 43.84$ |
| $r_{11} = -22.3301$ | $d_{11} = 0.2000$ | | |

Example 3-continued

| | | | |
|---|---|---|---|
| $r_{12} = 10.3432$ | $d_{12} = 5.7000$ | $n_{d8} = 1.43875$ | $v_{d8} = 94.97$ |
| $r_{13} = -8.4245$ | $d_{13} = 1.0000$ | $n_{d9} = 1.52944$ | $v_{d9} = 51.72$ |
| $r_{14} = 12.1356$ | $d_{14} = 0.4000$ | | |
| $r_{15} = 7.2541$ | $d_{15} = 6.4306$ | $n_{d10} = 1.56907$ | $v_{d10} = 71.30$ |
| $r_{16} = -19.6935$ | $d_{16} = 2.2900$ | $n_{d11} = 1.52944$ | $v_{d11} = 51.72$ |
| $r_{17} = 3.5017$ | $d_{17} = 5.6084$ | | |
| $r_{18} = -4.8304$ | $d_{18} = 1.0000$ | $n_{d12} = 1.51633$ | $v_{d12} = 64.15$ |
| $r_{19} = 24.9475$ | $d_{19} = 4.2000$ | $n_{d13} = 1.72600$ | $v_{d13} = 53.56$ |
| $r_{20} = -8.2093$ | | | |

$f_1 = 5.35$, $f_4 = -212.619$, $F_B = -29.303$, $D = 47.139$ (1) $n_2 - n_1 = 0.27017$
(2) $n_{13} - n_{12} = 0.20967$
(3) $f/f_1 = 0.841$
(4) $|f/f_4| = 0.021$
(5) $F_B/D = -0.622$

Example 4

| | | | |
|---|---|---|---|
| $r_1 = \infty$ | $d_1 = 0.8000$ | $n_{d1} = 1.51633$ | $v_{d1} = 64.15$ |
| $r_2 = -0.8501$ | $d_2 = 3.2000$ | $n_{d2} = 1.67790$ | $v_{d2} = 55.33$ |
| $r_3 = -3.3860$ | $d_3 = 0.1756$ | | |
| $r_4 = -8.5437$ | $d_4 = 3.0000$ | $n_{d3} = 1.56907$ | $v_{d3} = 71.30$ |
| $r_5 = -5.6960$ | $d_5 = 0.3340$ | | |
| $r_6 = 41.0592$ | $d_6 = 3.5000$ | $n_{d4} = 1.49700$ | $v_{d4} = 81.10$ |
| $r_7 = -10.5528$ | $d_7 = 0.2000$ | | |
| $r_8 = 79.3668$ | $d_8 = 1.0000$ | $n_{d5} = 1.61340$ | $v_{d5} = 43.84$ |
| $r_9 = 9.7196$ | $d_9 = 6.3000$ | $n_{d6} = 1.43875$ | $v_{d6} = 94.97$ |
| $r_{10} = -13.9507$ | $d_{10} = 1.7000$ | $n_{d7} = 1.61340$ | $v_{d7} = 43.84$ |
| $r_{11} = -47.9958$ | $d_{11} = 0.2000$ | | |
| $r_{12} = 13.1935$ | $d_{12} = 5.7000$ | $n_{d8} = 1.43875$ | $v_{d8} = 94.97$ |
| $r_{13} = -7.6887$ | $d_{13} = 1.0000$ | $n_{d9} = 1.52944$ | $v_{d9} = 51.72$ |
| $r_{14} = 92.1735$ | $d_{14} = 0.4000$ | | |
| $r_{15} = 6.6556$ | $d_{15} = 6.5134$ | $n_{d10} = 1.43875$ | $v_{d10} = 94.97$ |
| $r_{16} = -12.0952$ | $d_{16} = 2.2900$ | $n_{d11} = 1.50847$ | $v_{d11} = 60.83$ |
| $r_{17} = 3.4877$ | $d_{17} = 5.5256$ | | |
| $r_{18} = -4.6432$ | $d_{18} = 1.0000$ | $n_{d12} = 1.51633$ | $v_{d12} = 64.15$ |
| $r_{19} = 25.8216$ | $d_{19} = 4.2000$ | $n_{d13} = 1.72600$ | $v_{d13} = 53.56$ |
| $r_{20} = -8.1485$ | | | |

$f_1 = 5.234$, $f_4 = -37.442$, $F_B = -29.303$, $D = 47.039$ (1) $n_2 - n_1 = 0.16157$
(2) $n_{13} - n_{12} = 0.20967$
(3) $f/f_1 = 0.86$
(4) $|f/f_4| = 0.12$
(5) $F_B/D = -0.623$

The objective in each of the above-described Examples is used in combination with an imaging lens which has lens data shown below, for example, and which is illustrated in the sectional view of FIG. 5. In the following lens data: $r_1'$, $r_2'$ . . . are the curvature radii of lens surfaces, which are shown in order from the object side; $d_1'$, $d_2'$ . . . are the spacings between adjacent lens surfaces, shown in order from the object side; $n_{d1}'$, $n_{d2}'$ . . . are the refractive indices of the lenses for the spectral d-line, shown in order from the object side; and $v_{d1}'$, $v_{d2}'$ . . . are the Abbe numbers of the lenses, shown in order from the object side.

| | | | |
|---|---|---|---|
| $r_1' = 68.7541$ | $d_1' = 7.7321$ | $n_{d1}' = 1.48749$ | $v_{d1}' = 70.20$ |
| $r_2' = -37.5679$ | $d_2' = 3.4742$ | $n_{d2}' = 1.80610$ | $v_{d2}' = 40.95$ |
| $r_3' = -102.8477$ | $d_3' = 0.6973$ | | |
| $r_4' = 84.3099$ | $d_4' = 6.0238$ | $n_{d3}' = 1.83400$ | $v_{d3}' = 37.16$ |
| $r_5' = -50.7100$ | $d_5' = 3.0298$ | $n_{d4}' = 1.64450$ | $v_{d4}' = 40.82$ |
| $r_6' = 40.6619$ | | | |

Figure 5:
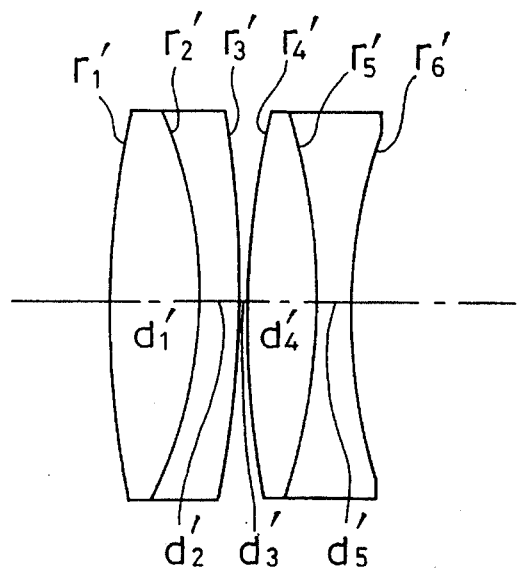
FIG. 5 is a sectional view of an imaging lens used in combination with the objective of each Example.
Figure 6A:
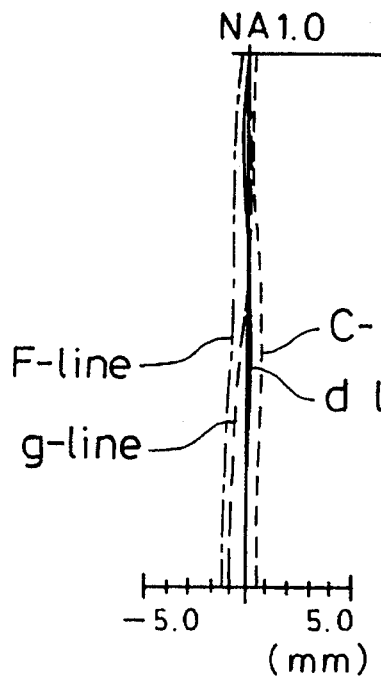
FIGS. 6A–6F graphically show spherical aberration, astigmatism, distortion and coma in Example 1.
Figure 6B:
Figure 6C:
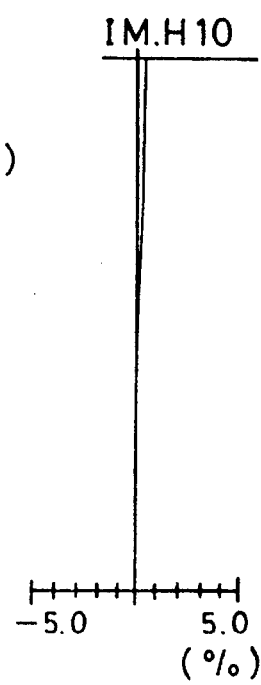
Figure 6D:
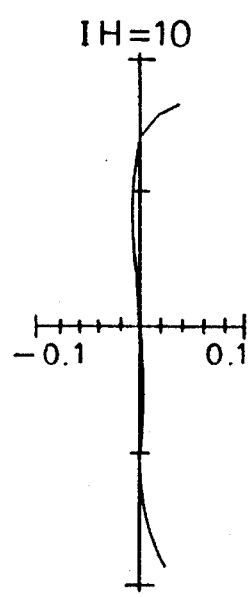
Figure 6E:
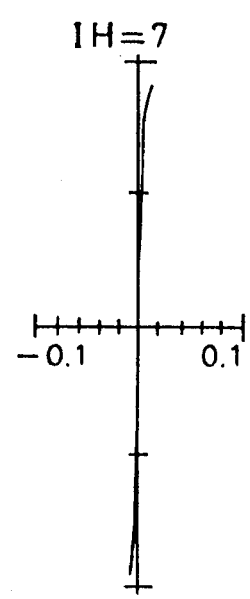
Figure 6F:
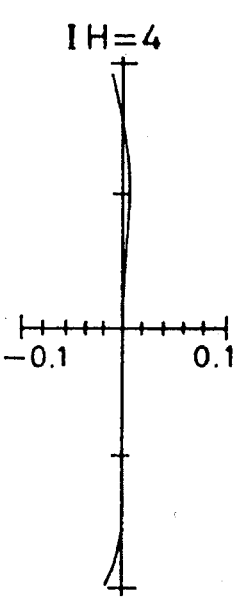
Figure 7A:
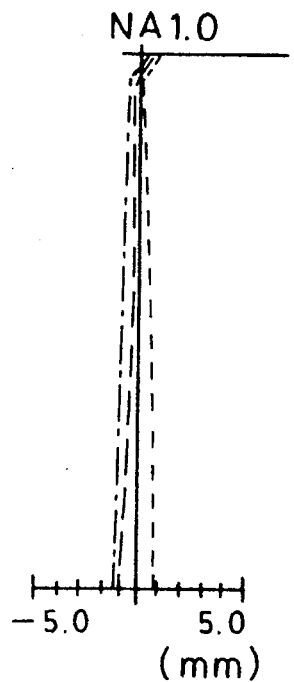
FIGS. 7A–7F graphically show spherical aberration, astigmatism, distortion and coma in Example 2.
Figure 7B:
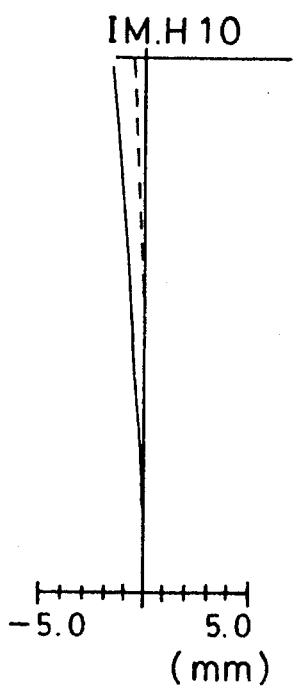
Figure 7C:
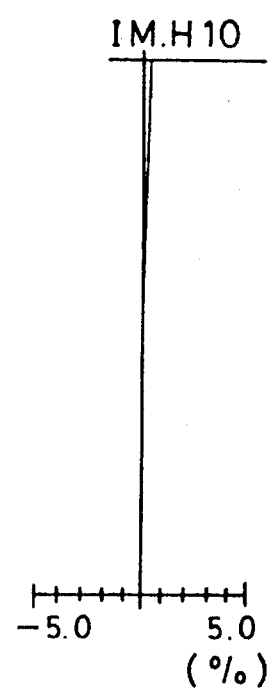
Figure 7D:
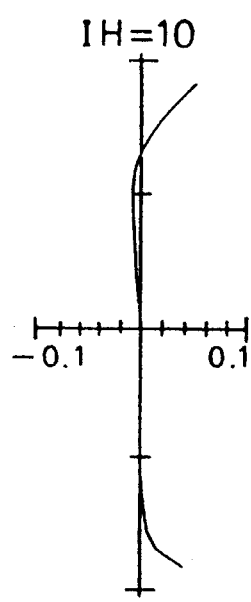
Figure 7E:
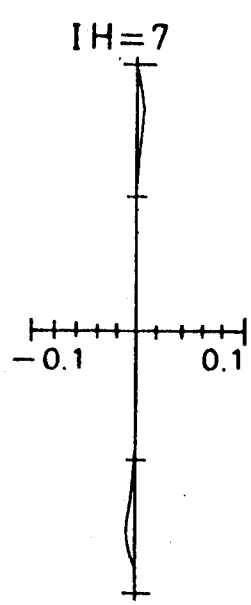
Figure 7F:
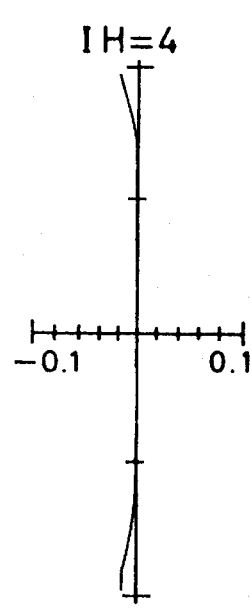
Figure 8A:
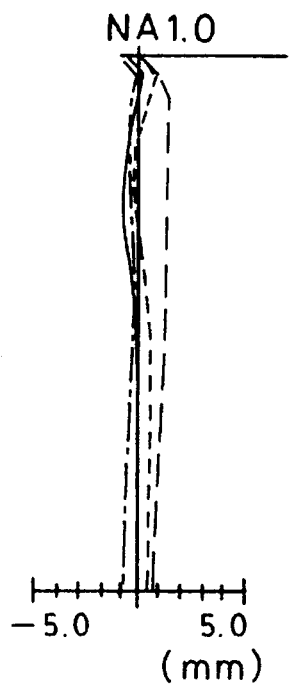
FIGS. 8A–8F graphically show spherical aberration, astigmatism, distortion and coma in Example 3.
Figure 8B:
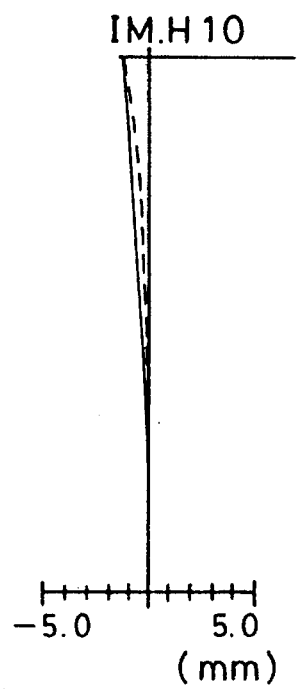
Figure 8C:
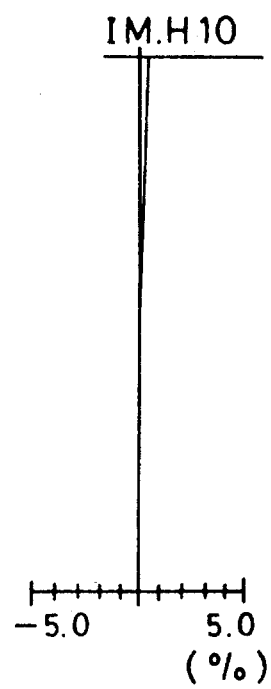
Figure 8D:
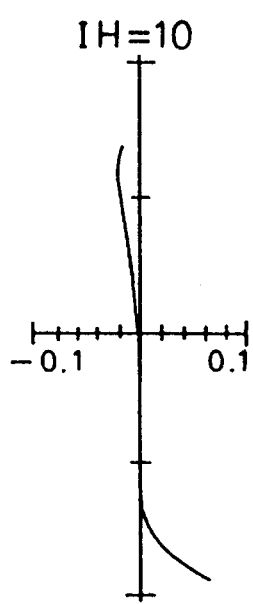
Figure 8E:
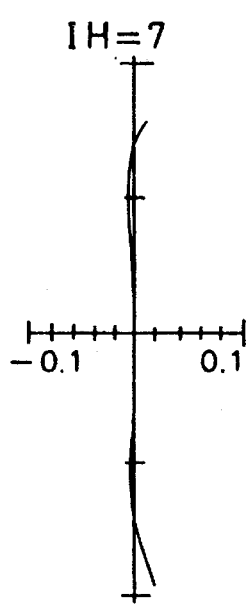
Figure 8F:
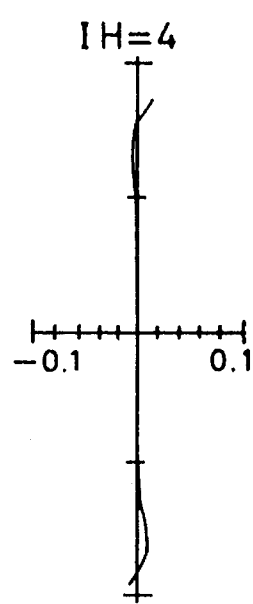

In this case, the spacing between the objective in Examples 1 to 4 and the imaging lens, shown in FIG. 5, may be set in the range of from 50 mm to 170 mm. FIGS. 6A to 9F graphically show spherical aberration, astigmatism, distortion, and coma in Examples 1 to 4, respectively, in a case where the spacing between the objective and the imaging lens is set at 55 mm. It should be noted that even when the above spacing is not 55 mm, if it is in the range of 50 mm to 170 mm, substantially the same aberration conditions are presented.

As has been described above, the present invention provides an immersion microscope objective having a magnification of about 40 and a numerical aperture of 1.0, which is superior in resolution and contrast and has a flattened image field over a wide field of view.

What we claim is:

1. A microscope objective having an object side, comprising, in order from the object side:

a first lens unit of positive refractive power including a cemented lens comprising a plano-convex lens and a meniscus lens including a concave surface directed toward the object side;

a second lens unit including a cemented lens comprising three lens elements a negative lens element, a positive lens element, and a negative lens element;

a third lens unit including a cemented lens;

a fourth lens unit including a cemented meniscus lens comprising a concave surface directed toward an image side of said microscope objective; and a fifth lens unit including a cemented meniscus lens comprising a negative lens and a positive lens and comprising a concave surface directed toward the object side;

wherein said microscope objective satisfies the following conditions:

$$n_2 - n_1 > 0.1 \tag{1}$$

$$n_{13} - n_{12} > 0.15 \tag{2}$$

$$f/f_1 > 0.65 \tag{3}$$

$$|f/f_4| < 0.2 \tag{4}$$

$$-0.8 < F_B/D < -0.3 \tag{5}$$

wherein $n_1$ and $n_2$ are the respective refractive indices of the plano-convex lens and the meniscus lens having a concave surface directed toward the object side in said first lens unit;

wherein $n_{12}$ and $n_{13}$ are the respective refractive indices of the negative and positive lenses in said fifth lens unit;

wherein $f_1$, $f_4$ and $f$ are the respective focal lengths of said first lens unit, said fourth lens unit and the microscope objective;

wherein $F_B$ is back focus of the microscope objective; and wherein D is distance from a first lens surface of the microscope objective to a final lens surface of the microscope objective.

2. A microscope objective according to claim 1, wherein said first lens unit further includes a meniscus lens having a concave surface directed toward the object side, and a positive lens.

3. An immersion microscope objective having an object side, comprising, in order from the object side:

a plano-convex cemented lens including a plano-convex lens and a meniscus lens including a concave surface directed toward the object side;

a plurality of single lenses;

a cemented lens including a negative lens, a positive lens, and a negative lens;

a second cemented lens; and two lenses including concave surfaces and which face each other, wherein said immersion microscope objective satisfies the following conditions:

$$n_2 - n_1 > 0.1 \tag{1}$$

$$-0.8 < F_B/D < -0.3 \tag{5}$$

wherein $n_1$ and $n_2$ are the respective refractive indices of the plano-convex lens and the meniscus lens having a concave surface directed toward the object side;

wherein $F_B$ is back focus of the immersion microscope objective;

wherein D is distance from a first lens surface of the microscope objective to a final lens surface of the microscope objective; and wherein said two lenses whose concave surfaces face each other include a lens comprising a concave surface directed toward an image side of said microscope objective, and a cemented lens including a positive lens and a negative lens and having a concave surface directed toward the object side, and satisfying the following conditions:

$$n_{13} - n_{12} > 0.15 \tag{2}$$

$$|f/f_4| < 0.2 \tag{4}$$

wherein $n_{12}$ and $n_{13}$ are the respective refractive indices of the negative and positive lenses of said cemented lens;

wherein $f_4$ is the focal length of said lens having a concave surface directed toward the image side; and wherein f is the focal length of the entire system.

* * * * *